US007311985B2

United States Patent
Boudjemaa et al.

(10) Patent No.: US 7,311,985 B2
(45) Date of Patent: Dec. 25, 2007

(54) DEVICE AND METHOD FOR SUPPLYING HYDROGEN TO A FUEL CELL, AND THE USE THEREOF FOR ELECTRIC VEHICLE TRACTION

(75) Inventors: Fabien Boudjemaa, Puteaux (FR); Luc Rouveyre, St-Maur des Fosses (FR); Sadok Garnit, Vallauris (FR); Rudolf Metkemeijer, Vallauris (FR)

(73) Assignees: Renault S.A.S., Boulogne Billancourt (FR); Association pour la Recherche et le Developpement des Methodes et Processus Industriels-A.R.M.I.N.E.S., Paris (FR)

( * ) Notice: Subject to any disclaimer, the term of this patent is extended or adjusted under 35 U.S.C. 154(b) by 442 days.

(21) Appl. No.: 10/488,091

(22) PCT Filed: Sep. 5, 2002

(86) PCT No.: PCT/FR02/03013

§ 371 (c)(1),
(2), (4) Date: Jul. 7, 2004

(87) PCT Pub. No.: WO03/021704

PCT Pub. Date: Mar. 13, 2003

(65) Prior Publication Data

US 2004/0253491 A1    Dec. 16, 2004

(30) Foreign Application Priority Data

Sep. 5, 2001   (FR) .................................. 01 11484

(51) Int. Cl.
*H01M 8/04*   (2006.01)
*H01M 8/01*   (2006.01)

(52) U.S. Cl. ......................... 429/17; 429/30

(58) Field of Classification Search .................. 429/19, 429/17, 20, 32, 30
See application file for complete search history.

(56) References Cited

U.S. PATENT DOCUMENTS

| 6,319,306 B1 | 11/2001 | Edlund et al. .................... 96/7 |
| 6,623,880 B1 * | 9/2003 | Geisbrecht et al. ........... 429/12 |
| 2002/0094463 A1 | 7/2002 | Luken et al. .................. 429/22 |

FOREIGN PATENT DOCUMENTS

| DE | 196 37 207 | 3/1998 |
| DE | 199 30 872 | 1/2001 |
| JP | 63-058767 | 3/1988 |

(Continued)

*Primary Examiner*—Patrick Joseph Ryan
*Assistant Examiner*—Thomas H. Parsons
(74) *Attorney, Agent, or Firm*—Oblon, Spivak, McClelland, Maier & Neustadt, P.C.

(57) ABSTRACT

A device used to supply a gas mixture including hydrogen and carbon monoxide at a concentration not exceeding 100 ppm to a main fuel cell which is supplied with air. The device includes a reformer, which is used to convert a fuel into a gas mixture including carbon monoxide and hydrogen, and a purification device to diminish the concentration of carbon monoxide in the gas mixture and that is connected to an anode inlet of the main fuel cell. The supply device also includes an auxiliary fuel cell supplied with air and that receives the carbon monoxide produced by the reformer to convert part of the chemical energy of the carbon monoxide into electrical energy.

11 Claims, 4 Drawing Sheets

FOREIGN PATENT DOCUMENTS

| | | |
|---|---|---|
| JP | 4-087262 | 3/1992 |
| JP | 6-089735 | 3/1994 |
| JP | 8-306369 | 11/1996 |
| JP | 11-339820 | 12/1999 |
| WO | 00/16880 | 3/2000 |
| WO | 01/03223 | 1/2001 |

* cited by examiner

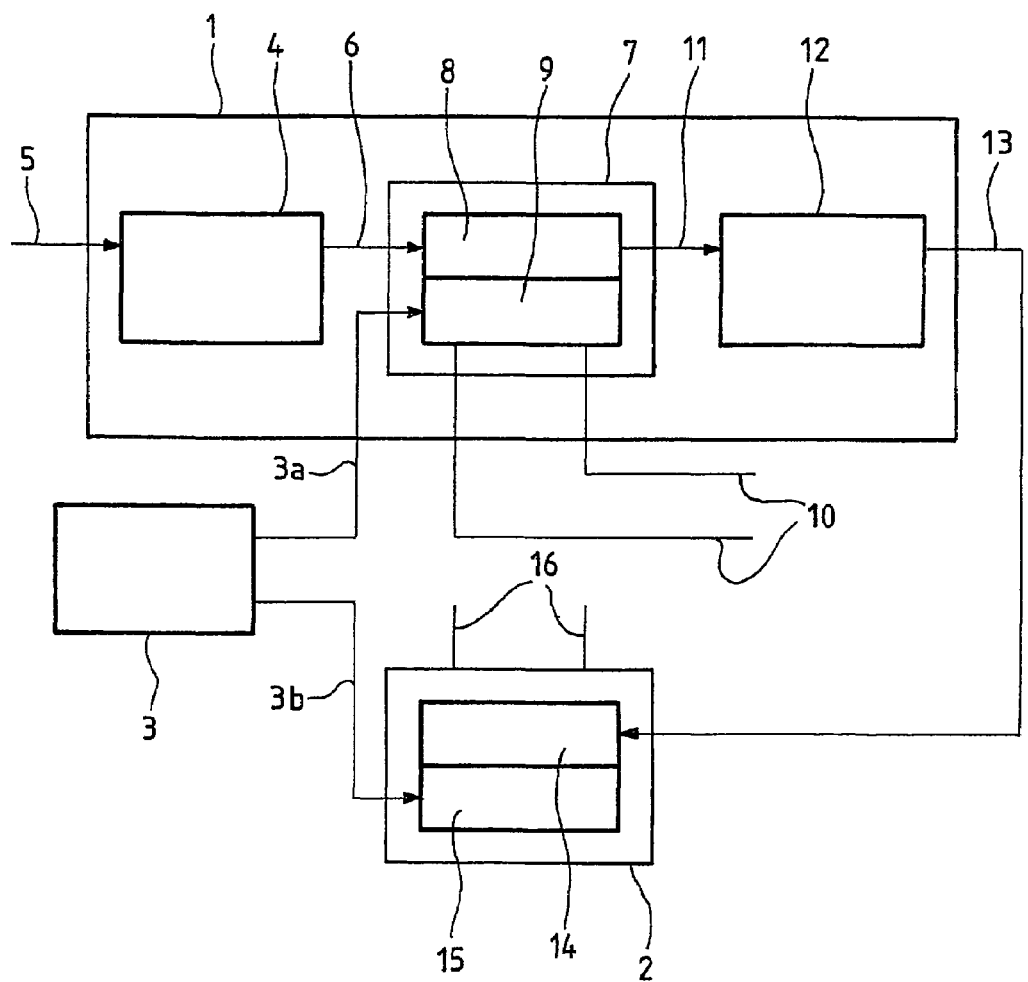

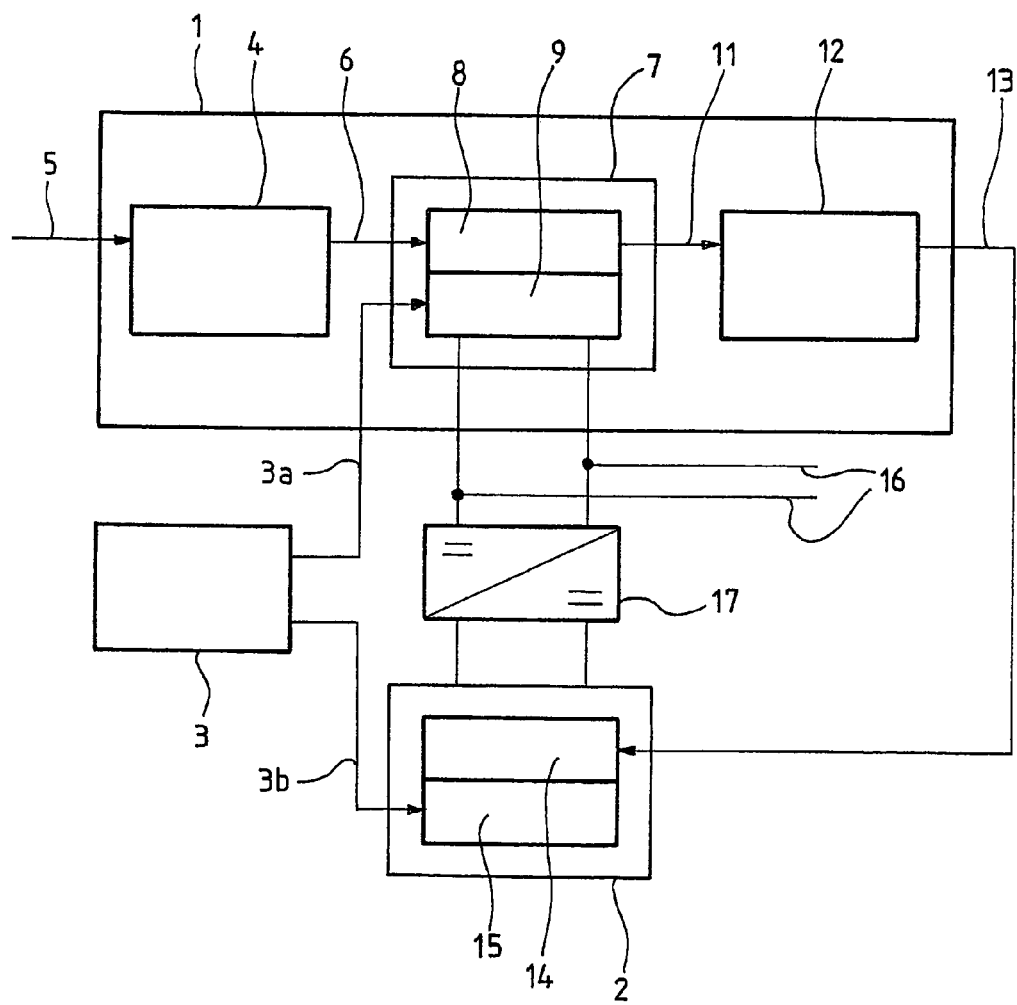

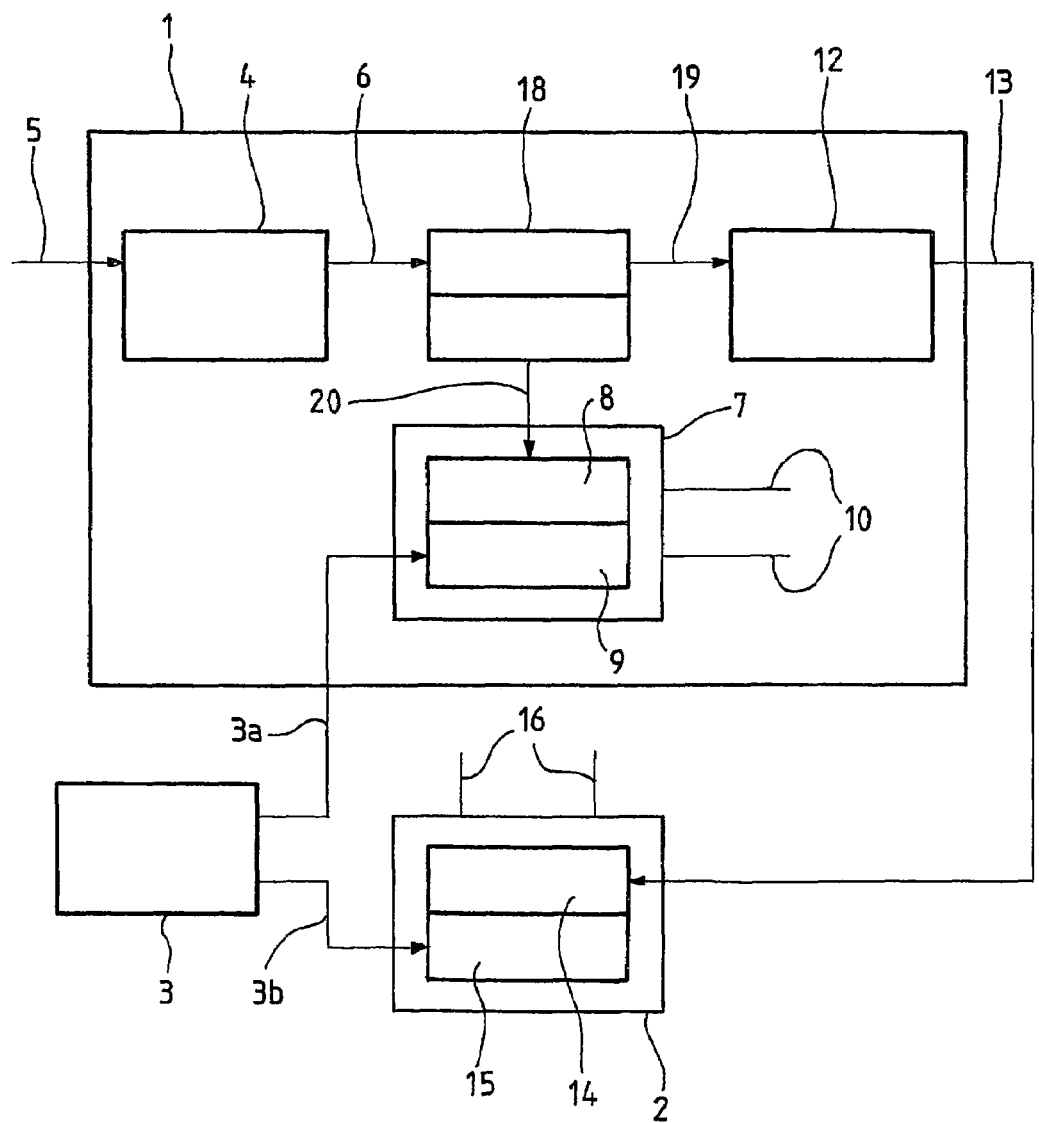
FIG_3

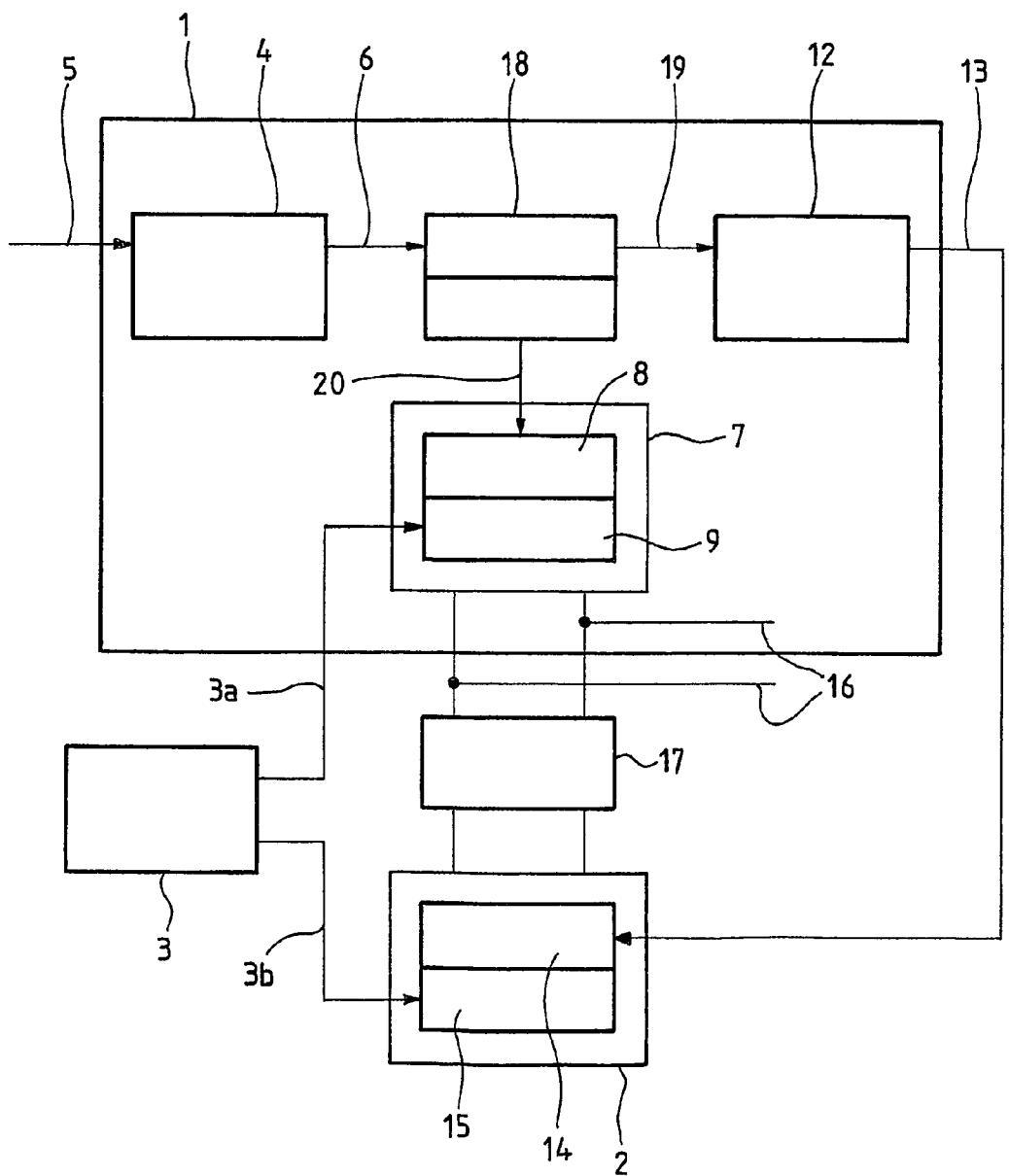

DEVICE AND METHOD FOR SUPPLYING HYDROGEN TO A FUEL CELL, AND THE USE THEREOF FOR ELECTRIC VEHICLE TRACTION

BACKGROUND OF THE INVENTION

I. Field of the Invention

The present invention relates to a device for supplying hydrogen to a fuel cell used in particular for electric propulsion of a motor vehicle, and it relates more particularly to fuel cells of the PEFC type (polymer electrolyte fuel cell).

II. Description of Related Art

The fuel cell increasingly appears to be the most appropriate and most efficient energy converter for converting chemical energy into energy that can be directly used in electrical and thermal form.

Its operating principle is simple: it comprises controlled electrochemical combustion of hydrogen and oxygen with simultaneous production of electricity, water and heat according to the following chemical reaction: $H_2 + \frac{1}{2}O_2 \rightarrow H_2O$. This reaction takes place in a structure composed substantially of two electrodes, the anode and cathode, separated by an electrolyte: it is the reverse reaction of the electrolysis of water.

Since the fuel supplying the anode for the electrochemical reaction is hydrogen, two solutions are available to the user. A first solution is to store the hydrogen close to the cell and to consume it as needed. Today, however, this poses numerous problems such as the method for production of the hydrogen, the economical and environmental cost thereof, the manner of storage thereof and even the safety of use thereof. A second solution is to produce the hydrogen from a hydrogen-containing fuel, such as an alcohol or a hydrocarbon. The system with which fuel can be transformed to hydrogen is known as a hydrogen processor. It traditionally uses a plurality of process steps, which may be chemical or physical. The processor is composed mainly of a first reforming stage, in which the fuel is converted to a mixture of $H_2$, $CO_2$, CO, $N_2$ and $H_2O$. This stage is directly followed by purification aimed at reducing the carbon monoxide concentration, in view of its highly toxic nature for humans and for the fuel cell.

These hydrogen processors, however, have the disadvantage that they are cumbersome and expensive.

BRIEF SUMMARY OF THE INVENTION

The present invention proposes a device for supplying hydrogen to a fuel cell while overcoming these disadvantages.

In particular, the present invention proposes a device having one less purification stage, for supplying hydrogen to a fuel cell, thus simplifying the thermal management of the hydrogen processor. In addition, the device reuses the carbon monoxide obtained from reforming, by converting it to electrical energy, thus increasing the efficiency of the fuel cell.

The inventive device for supplying a gaseous mixture containing hydrogen and carbon monoxide in a content not exceeding 100 ppm to a primary fuel cell supplied with air comprises a reformer intended to transform a fuel into a gaseous mixture containing carbon monoxide and hydrogen, and a purification device intended to lower the carbon monoxide concentration of the gaseous mixture and connected to an inlet of the anode of the primary fuel cell. The supply device also comprises an auxiliary fuel cell supplied with air and receiving carbon monoxide produced by the reformer, in order to convert part of the chemical energy of the carbon monoxide to electrical energy.

According to a preferred embodiment of the inventive device, the primary fuel cell is a polymer electrolyte fuel cell (PEFC), while the auxiliary fuel cell is a solid oxide fuel cell (SOFC).

The auxiliary fuel cell can advantageously be provided with an electrode that ensures that the carbon monoxide will be oxidized faster than the hydrogen.

According to the inventive device, the purification device is connected to the auxiliary fuel cell and to the primary fuel cell.

According to the inventive device, the auxiliary fuel cell is connected to an auxiliary electrical supply circuit and the primary fuel cell is connected to a primary electrical circuit. The auxiliary electrical supply circuit can supply electricity to a module for supplying air to the primary fuel cell and to the auxiliary fuel cell.

According to an alternative version of the invention, the supply device of the primary fuel cell additionally comprises a gas-permeation membrane intended to separate the hydrogen from the other gases and connected to the reformer, to the purification device and to the auxiliary fuel cell, and mounted in such a way that the hydrogen thus separated is passed into the purification device while the other gases, including carbon monoxide, are passed into the auxiliary fuel cell.

According to another alternative version of the invention, the auxiliary fuel cell is electrically connected in parallel with the primary fuel cell, and an electrical interface intended to supply electricity to a primary electrical circuit is connected to both cells.

The invention also relates to a method for supplying a gaseous mixture containing hydrogen and carbon monoxide in a concentration not exceeding 100 ppm to a primary fuel cell comprising a reforming stage intended to convert a fuel into a gaseous mixture containing hydrogen and carbon monoxide, as well as a purification stage intended to lower the carbon monoxide concentration of the gaseous mixture. The inventive method also includes a stage of conversion of part of the chemical energy of the carbon monoxide deriving from the reformer into electrical energy.

According to the inventive method, the conversion of the chemical energy to electrical energy is assured by means of an auxiliary fuel cell.

The invention also relates to the use of a fuel cell supplied by one of the devices mentioned hereinabove for electrical propulsion of a vehicle.

BRIEF DESCRIPTION OF THE DRAWINGS

Other advantages and characteristics of the invention will become apparent from examination of the detailed description of different but in no way limitative embodiments of the inventive device, illustrated in FIGS. 1 to 4, wherein:

FIG. 1 illustrates a device for supplying hydrogen to a fuel cell according to a first embodiment of the invention;

FIG. 2 illustrates an alternative version of the first embodiment, in which the primary fuel cell is electrically connected in parallel with the auxiliary fuel cell;

FIG. 3 illustrates a device according to a second embodiment of the invention, in which a gas-permeation membrane is interposed between the reformer and the purification device, and;

FIG. 4 illustrates an alternative version of the second embodiment, in which the primary fuel cell is electrically connected in parallel with the auxiliary fuel cell.

DETAILED DESCRIPTION OF THE INVENTION

FIG. 1 shows a hydrogen processor 1 connected to a primary fuel cell 2 and an air-supply device 3.

Hydrogen processor 1 is provided with a reformer 4, into which a fuel 5 is passed. Reformer 4 ensures transformation of fuel 5 into a gaseous mixture 6 containing H2, CO2, CO, N2 and H2O. This gaseous mixture 6 is passed to anode 8 of an auxiliary fuel cell 7 composed of this anode 8 and of a cathode 9.

Auxiliary fuel cell 7 is intended to consume part of the carbon monoxide deriving from reformer 4 and to convert part of the chemical energy of the carbon monoxide to electrical energy. Preferably a solid oxide fuel cell will be used as auxiliary fuel cell 7, although other types of cells can be envisioned.

A fuel cell makes it possible to oxidize the fuel in the course of an exothermic electrochemical reaction. At anode 8 of auxiliary fuel cell 7, supplied by gaseous mixture 6 deriving from reformer 4, the gaseous H2 and CO are oxidized to H2O and CO2. Anode 8 of auxiliary fuel cell 7 may contain a catalyst such as nickel. At cathode 9, supplied with air by air-supply device 3 and connected to this cathode 9 by a duct 3a, the oxygen of the air is reduced. Preferably auxiliary fuel cell 7 contains an electrode capable of oxidizing the carbon monoxide faster than the hydrogen.

The electricity produced by auxiliary fuel cell 7 is passed to an auxiliary electrical supply circuit 10, which is capable in particular of supplying electricity to air-supply device 3.

During its passage into auxiliary fuel cell 7, gaseous mixture 6 is transformed to a gaseous mixture 11 depleted of carbon monoxide. Thus, by using a solid oxide fuel cell as auxiliary fuel cell 7, the carbon monoxide concentration is lowered to 1%.

Gaseous mixture 11 then penetrates into a purification device 12 intended to lower the carbon monoxide concentration of gaseous mixture 11 even further. In this way gaseous mixture 11 is transformed into a gaseous mixture 13, whose carbon monoxide concentration does not exceed 100 ppm.

Gaseous mixture 13 is passed to anode 14 of primary fuel cell 2 containing this anode 14 and a cathode 15. Cathode 15 is supplied with air by air-supply device 3, connected to this cathode 15 by duct 3b. Primary fuel cell 2 is capable of converting most of the chemical energy of gaseous mixture 13 to electrical energy, which is transferred to a primary electrical circuit 16.

Primary fuel cell 2 is preferably a PEFC. This cell, in which the electrolyte is in the form of a polymer, has an operating temperature of about 100° C., thus making it compatible for use as an on-board electricity-generating means. Of course, other types of cells can be envisioned.

FIG. 2, where identical elements have the same reference numerals, shows an alternative version composed of the same main elements. In the device of FIG. 2, in order to supply primary electrical circuit 16, auxiliary fuel cell 7 is, however, electrically connected in parallel with primary fuel cell 2 via an electronic interface 17 comprising, for example, inverter devices and a transformer. A separate auxiliary electrical circuit is no longer provided. The entire electrical energy generated is therefore passed to primary electrical circuit 16.

In a second embodiment illustrated in FIG. 3, where identical elements have the same reference numerals, a gas-permeation membrane 18 having pronounced selectivity for hydrogen has been interposed between reformer 4 and purification device 12. This gas-permeation membrane 18 makes it possible to separate gaseous mixture 6 deriving from reformer 4 into a gaseous mixture 19 with high hydrogen concentration and a gaseous mixture 20 containing the other gases, including carbon monoxide. Gaseous mixture 19 with high hydrogen concentration is passed to purification device 12, while gaseous mixture 20 containing the other gases, including carbon monoxide, is passed to anode 8 of auxiliary fuel cell 7. Otherwise the second embodiment is identical to the first embodiment illustrated in FIG. 1.

The alternative version illustrated in FIG. 4 is the same as the device illustrated in FIG. 3, but this time, in order to supply primary electrical circuit 16, auxiliary fuel cell 7 is electrically connected in parallel with primary fuel cell 2 via an electronic interface 17 of the same type as that used in the alternative version of FIG. 2. A separate auxiliary electrical circuit is no longer provided. The entire electrical energy generated is therefore passed to primary electrical circuit 16.

The inventive devices for supplying a primary fuel cell can be advantageously used for electrical propulsion of vehicles.

They can also be used for collective and individual electricity generation, and in particular for electrothermal cogenerators.

The invention claimed is:

1. A device for supplying a gaseous mixture containing hydrogen and carbon monoxide in a concentration not exceeding 100 ppm to a primary fuel cell supplied with air, comprising:
   a reformer configured to convert a fuel into a gaseous mixture containing carbon monoxide and hydrogen;
   a purification device configured to lower the carbon monoxide concentration of the gaseous mixture and connected to an inlet of an anode of the primary fuel cell;
   an auxiliary fuel cell, configured to be supplied with air and receive carbon monoxide produced by the reformer, and configured to convert part of chemical energy of the carbon monoxide to electrical energy; and
   a gas-permeation membrane configured to separate the hydrogen from other gases, and connected to the reformer, to the purification device, and to the auxiliary fuel cell, and mounted such that the hydrogen thus separated is passed into the purification device and the other gases, including the carbon monoxide, are passed into the auxiliary fuel cell.

2. A device for supplying a primary fuel cell according to claim 1, wherein the primary fuel cell is a PEFC.

3. A device for supplying a primary fuel cell according to claim 1, wherein the auxiliary fuel cell is a solid oxide fuel cell.

4. A device for supplying a primary fuel cell according to claim 1, wherein the auxiliary fuel cell is provided with an electrode that ensures that the carbon monoxide will be oxidized faster than the hydrogen.

5. A device for supplying a primary fuel cell according to claim 1, wherein the auxiliary fuel cell is connected to an auxiliary electrical supply circuit, the primary fuel cell being connected to a primary electrical circuit.

6. A device for supplying a primary fuel cell according to claim 1, wherein the auxiliary fuel cell is electrically connected in parallel with the primary fuel cell, and further comprising an electrical interface configured to supply electricity to a primary electrical circuit connected to the auxiliary fuel cell and the primary fuel cell.

7. A device for supplying a primary fuel cell according to claim 1, wherein the device for supplying the primary fuel cell is configured to supply the primary fuel cell that electrically propels a vehicle.

8. A fuel cell apparatus, comprising:
   a primary fuel cell;
   the device for supplying the primary fuel cell according to claim 5, and
   a module configured to supply air to the primary fuel cell and to the auxiliary fuel cell,
   wherein the auxiliary electrical supply circuit is configured to supply electricity to the module configured to supply air to the primary fuel cell and to the auxiliary fuel cell.

9. A method for supplying a gaseous mixture containing hydrogen and carbon monoxide in a concentration not exceeding 100 ppm to a primary fuel cell comprising:
   reforming a fuel to convert the fuel into a gaseous mixture containing hydrogen and carbon monoxide;
   separating the gaseous mixture into a first gaseous mixture with a high hydrogen concentration and a second gaseous mixture containing other gases including the carbon monoxide;
   passing the first gaseous mixture with a high hydrogen concentration into an auxiliary fuel cell;
   passing the second gaseous mixture containing other gases including the carbon monoxide into a purification device;
   purifying the second gaseous mixture to lower the carbon monoxide concentration of the second gaseous mixture; and
   converting part of chemical energy of the carbon monoxide derived from the reforming into electrical energy.

10. A method according to claim 9, wherein the converting part of the chemical energy to the electrical energy is assured by the auxiliary fuel cell.

11. A device for supplying a gaseous mixture to a primary fuel cell, comprising:
   a reformer configured to convert a fuel into a gaseous mixture containing carbon monoxide and hydrogen;
   a gas-permeation membrane configured to separate the hydrogen from other gases;
   an auxiliary fuel cell configured to receive the carbon monoxide produced by the reformer and to convert part of chemical energy of the carbon monoxide to electrical energy; and
   a purification device connected to an inlet of an anode of the primary fuel cell and configured to lower a carbon monoxide concentration of the gaseous mixture, wherein
   the carbon monoxide concentration of the gaseous mixture leaving the purification device does not exceed 100 ppm,
   the gas-permeation membrane is positioned downstream from the reformer and upstream from the purification device and the auxiliary fuel cell, and
   the hydrogen separated by the gas-permeation membrane is passed into the purification device and the other gases, including the carbon monoxide, are passed into the auxiliary fuel cell.

* * * * *